United States Patent
Scott et al.

(10) Patent No.: US 6,535,549 B1
(45) Date of Patent: Mar. 18, 2003

(54) METHOD AND APPARATUS FOR CARRIER PHASE TRACKING

(75) Inventors: Kenneth E. Scott, Calgary (CA); Elizabeth B. Olasz, Calgary (CA)

(73) Assignee: Harris Canada, Inc., Calgary (CA)

( * ) Notice: Subject to any disclaimer, the term of this patent is extended or adjusted under 35 U.S.C. 154(b) by 0 days.

(21) Appl. No.: 09/395,699

(22) Filed: Sep. 14, 1999

(51) Int. Cl.[7] .................. H04L 27/22; H04B 1/38; H04B 3/10; H04J 15/00; H04N 9/89
(52) U.S. Cl. ............... 375/219; 375/326; 370/464; 370/491; 379/343; 386/16
(58) Field of Search .................. 370/335, 491, 370/321; 375/200, 205, 208; 362/174, 160; 367/194, 90; 343/893; 330/52

(56) References Cited

U.S. PATENT DOCUMENTS

| | | | | |
|---|---|---|---|---|
| 3,634,773 A | * | 1/1972 | Kobayashi | 329/311 |
| 3,959,726 A | * | 5/1976 | Hinoshita et al. | 375/293 |
| 4,122,448 A | * | 10/1978 | Martin | |
| 5,960,029 A | * | 9/1999 | Kim et al. | 375/140 |
| 6,366,621 B1 | * | 4/2002 | Kuntz et al. | 375/321 |
| 6,366,629 B1 | * | 4/2002 | Chen et al. | 375/355 |

FOREIGN PATENT DOCUMENTS

GB         2092845 A      1/1982      .............. H03J/7/02

OTHER PUBLICATIONS

Mathiopoulos, In–Band Pilot Insertion at the Nyquist Frequency for Transparent Signalling, Proceedings of the Global Telecommunications, US, New York, IEEE, Nov. 1987, pp. 2063–2068 XP000795151.

* cited by examiner

*Primary Examiner*—Stephen Chin
*Assistant Examiner*—Edith Yeh
(74) *Attorney, Agent, or Firm*—Cesari and McKenna, LLP

(57) ABSTRACT

A method and telecommunication system for tracking the carrier phase of a received signal includes the addition of a pilot signal to the data component of the signal prior to modulation and transmission. The pilot signal is specified to have a frequency equal to the inverse of twice a data symbol interval with zero crossings positioned at the midpoint of each symbol interval to avoid interference with the data. The received signal is demodulated to produce a complex data signal from which the pilot signal is detected to provide an estimate of the phase error in the complex data signal. The elimination of the phase error from the complex data signal is accomplished through a corrective phase shift that is equal and opposite to the estimated phase error. A sample timing estimate may also be obtained in a similar manner.

16 Claims, 7 Drawing Sheets

METHOD AND APPARATUS FOR CARRIER PHASE TRACKING

FIELD OF THE INVENTION

This invention relates generally to telecommunications systems, and in particular to digital communications systems employing higher order linear modulation.

BACKGROUND OF THE INVENTION

Digital communications systems for the transmission of information, or data, are commonplace. An information-bearing signal generally consists of a stream of data symbols, each one being selected from a set of possible discrete values or levels, e.g., +1 or −1, and can be viewed as a "baseband" signal because it has a frequency spectrum ranging from DC to approximately the maximum data rate in symbols per second. To more efficiently transmit the information through a medium, or channel, a transmitter may "modulate" the data onto a "carrier" sinusoid. A local reference generator at the transmitter produces the carrier sinusoid of frequency $f_c$, which is usually selected to be much higher than the maximum baseband frequency. Data modulation is simply the modulation of the carrier's frequency, phase and/or magnitude, according to the data bit values. As a result of this modulation, the information-bearing signal is shifted from baseband up to the carrier frequency $f_c$, which is chosen to avoid interference with other transmitted signals.

One of the first functions of a receiver, therefore, is to shift, or demodulate, the information-bearing component of a received signal back down to baseband by multiplying it with a local reference of frequency $f_c$. This frequency-shifting function, referred to as "carrier recovery" or "phase tracking", must be very accurate; otherwise, the receiver may make errors during detection when it determines the data bit values represented by received symbols. Unfortunately, an accurate down-conversion is difficult due to phase variations introduced into the received signal by two separate processes. First, in wireless channels, the transmitted signal may be is Doppler shifted as it passes through the channel due to relative motion between the transmitter and receiver. Second, the local reference at the transmitter may be out of phase with the local reference at the receiver. In fact, the phase error may even be time varying.

Carrier recovery is commonly performed at the carrier frequency, wherein a carrier phase estimate derived from the demodulated signal is used to dynamically adjust the phase of the receiver's local reference. However, when the carrier is complex-modulated, i.e., the data bit value is encoded into the phase of the transmitted data symbol, carrier recovery at radio frequencies is particularly difficult. Most conventional systems employ either a non-linear operation, such as a Costas loop or a squaring loop, or a decision-directed operation to track the carrier. In the first case, the received signal is passed through a non-linear function to generate power at the carrier frequency onto which a phase-locked loop (PLL) can lock and then track the carrier. The complexity of a non-linear operation increases with the order of modulation, however, and is thus impractical for use with higher-order modulation schemes. Differential encoding at the transmitter, along with differential decoding at the receiver, is also required because of a fixed phase ambiguity between the estimate produced by the non-linear operation and the received signal. For high-order modulation schemes, decision-directed operation can be more easily implemented than the techniques based on non-linear operations, but it works poorly when a received signal has a low signal-to-noise ratio (SNR), i.e., a bit error rate greater than $10^{-2}$. A high bit error rate can also be caused by signal distortions, for example, time dispersion. Since the decision-directed techniques rely on correct decisions, significant levels of these distortions are not tolerable.

Therefore, what is needed is a method for tracking the carrier phase of a received signal in a telecommunication system employing higher-order complex modulation. Such a method should not require modification of the information-bearing signal and should be capable of performing in less than optimal channel conditions.

SUMMARY OF THE INVENTION

A method and system for tracking the carrier phase of a received signal includes the addition of a pilot signal (also referred to herein as a pilot tone) to the information-bearing component of the signal prior to modulation and transmission. The received signal is demodulated to produce a complex data signal from which the pilot tone is detected to thereby provide an estimate of the phase error in the complex data signal. The elimination of the phase error from the complex data signal is accomplished through a corrective phase shift that is equal and opposite to the estimated phase error. A sample timing estimate may be obtained from the pilot tone in a similar manner. The phase and frequency of the pilot tone are selected such that the pilot tone does not interfere with the information-bearing component of the transmitted signal. Therefore, other than the simple addition of the pilot tone, no modification of the information-bearing component is required. Furthermore, the method can be readily implemented in higher-order modulation schemes and, because pilot tone detection is insensitive to the exact magnitude of the pilot tone, the method is also robust.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
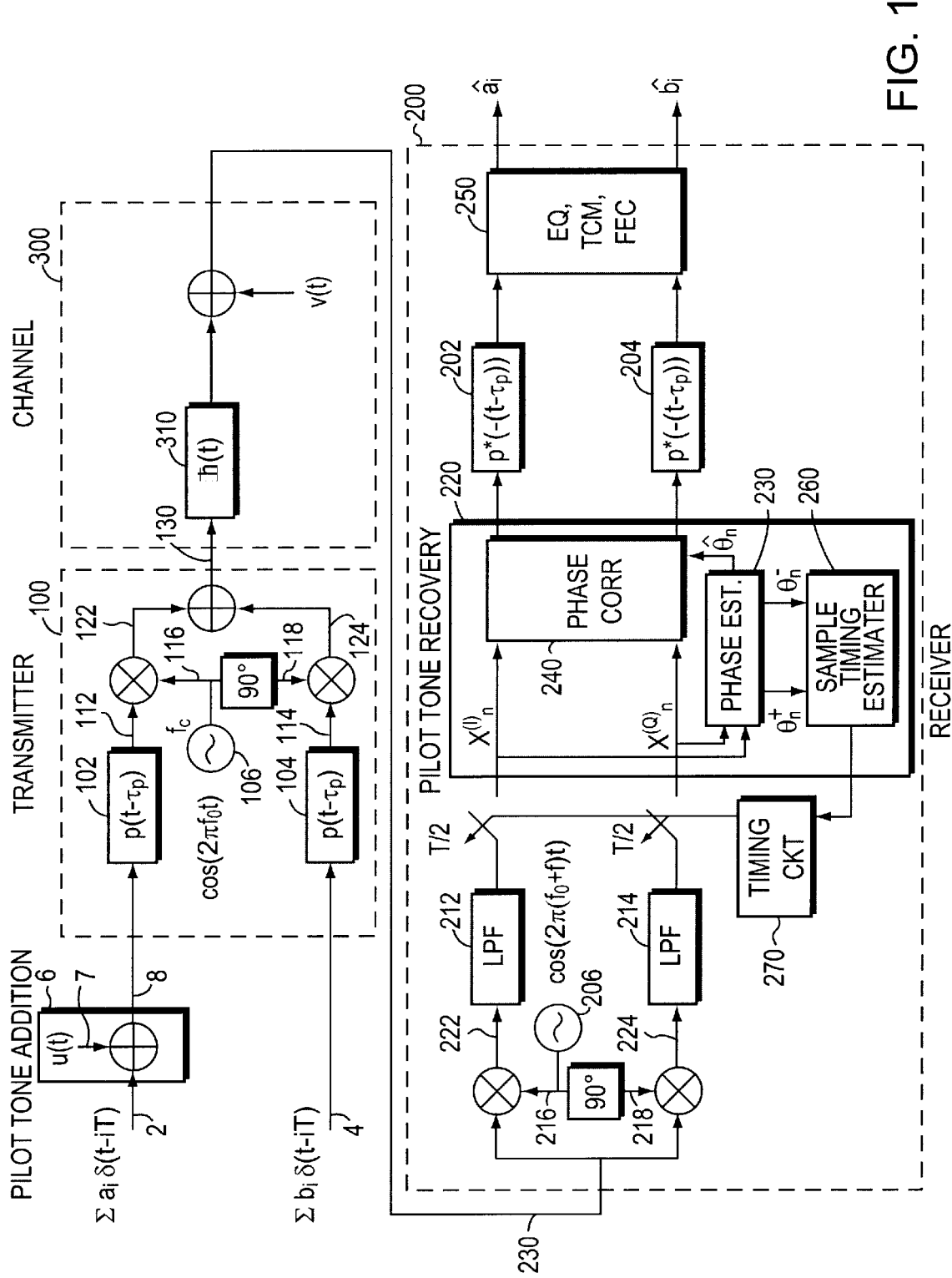
FIG. 1 is a diagram of a telecommunications system incorporating the invention.
Figure 2:
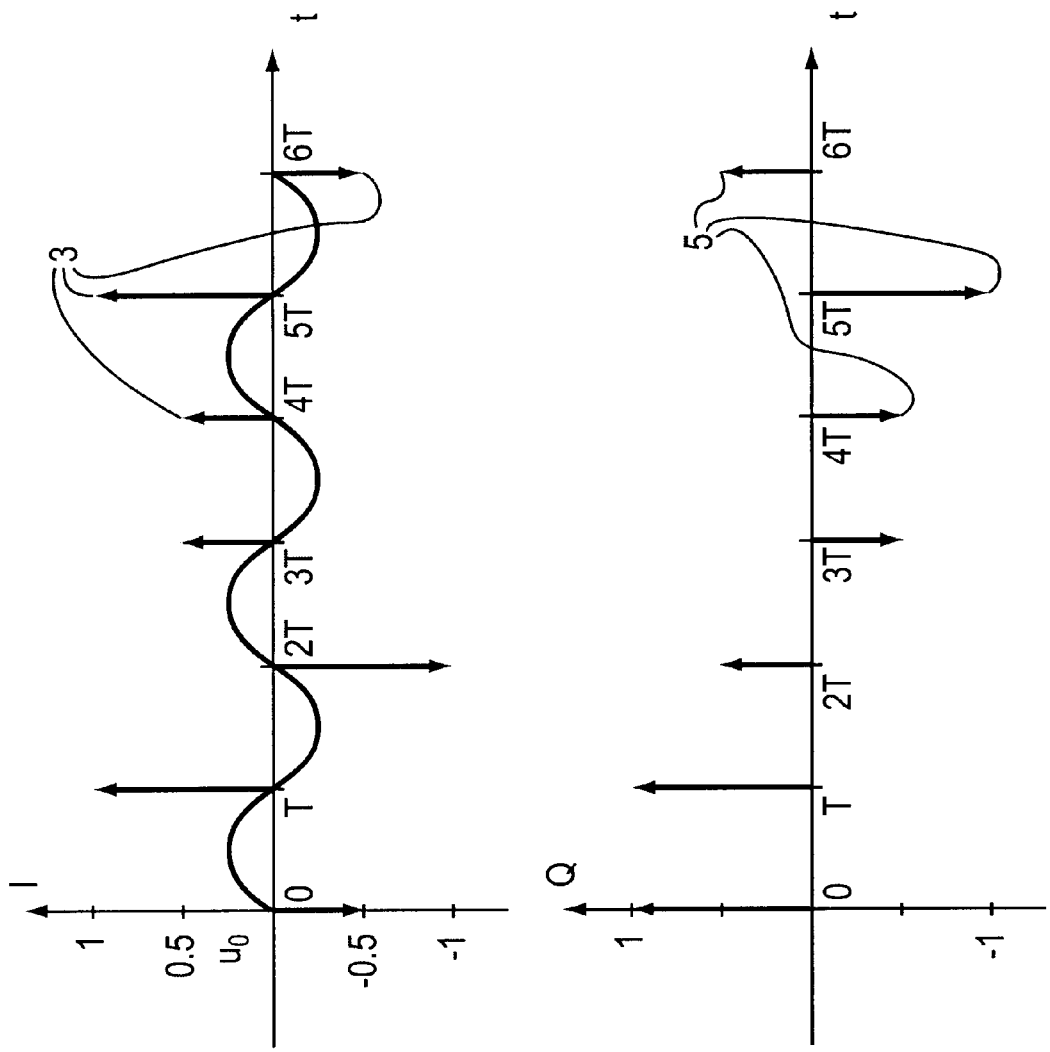
FIG. 2 is the time domain representation of a baseband signal and a pilot tone.

A telecommunications system incorporating the invention is illustrated in FIG. 1. Although any of a variety of higher order linear modulation techniques, such as quadrature amplitude modulation (QAM) or trellis coded modulation (TCM), may be used, the system depicted in FIG. 1 employs QAM. The system includes a transmitter 100 and a receiver 200 communicating through a channel 300. An inphase data signal 2 comprises the inphase part, $a_i$, of the $i^{th}$ transmitted data symbol and a quadrature data signal 4 comprises the quadrature part, $b_i$, of the $i^{th}$ transmitted data symbol. For simplicity, each data signal can be represented mathematically as a train of Kronecker delta functions (8) 3, 5 (i.e., a delta function of unit amplitude) spaced at T seconds, each multiplied by one of a set of amplitude values (e.g., −1, −0.5, +0.5, +1), as shown in FIG. 2.

The inventive telecommunication system includes a circuit 6 that adds a pilot tone 7 to either one of the data signals, typically the inphase data signal 2. The pilot tone 7 is phase-locked to the data clock (not shown) and is selected to have a period of 2T and a phase such that the zero crossings occur at nT seconds, i.e., the pilot tone 7 has zero magnitude at the center of each symbol interva (FIG. 2), and may be represented mathematically as $u(t) = U_o \sin(2\pi(1/2T)t)$. This frequency and phase specification ensures that the pilot tone minimally interferes with the inphase and quadrature data signals. At the same time, the pilot tone is within the bandwidth of the information signal, so that the bandwidth of the transmitted signal is not increased. Because the pilot tone does not contain information (other than a frequency and phase related to the carrier), its power may be much lower than the power of the information-bearing component. It has been determined experimentally that the power of the pilot tone can be 5 to 10 dB lower than that of the information signal.

Figure 3:
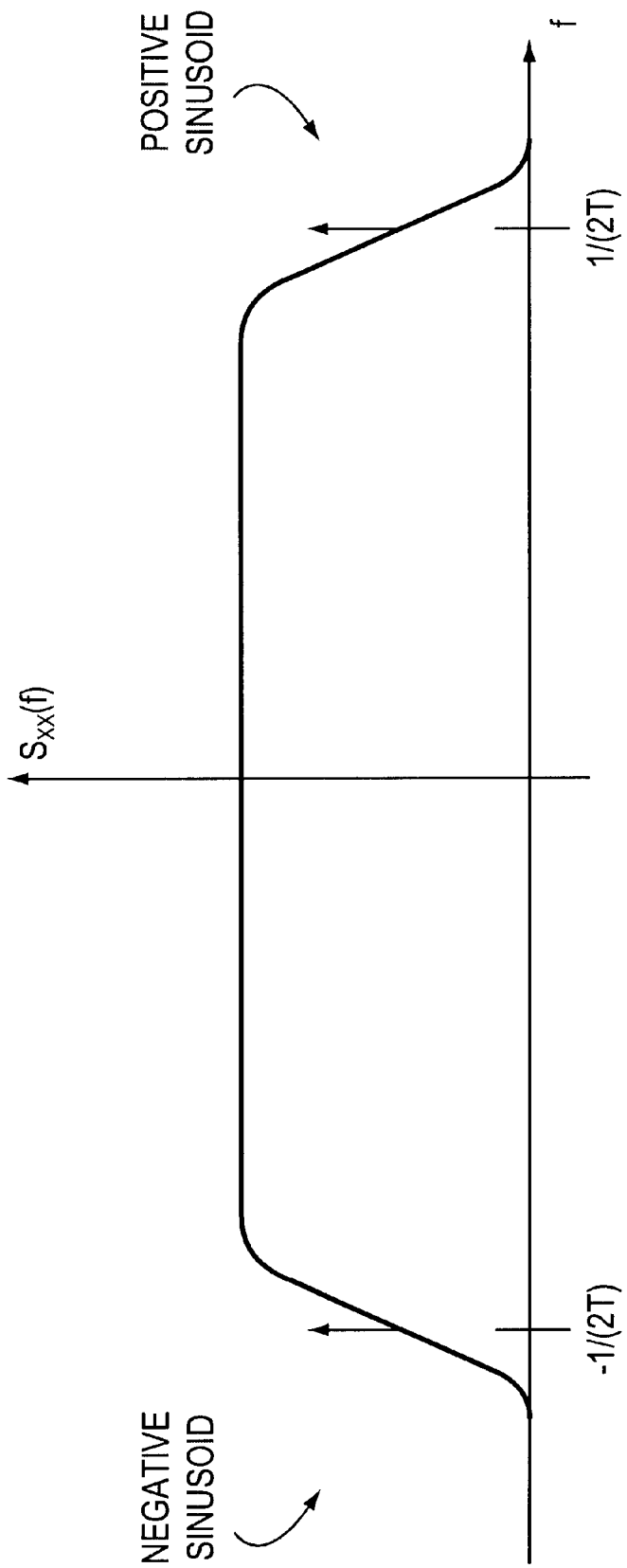
FIG. 3 is the frequency domain representation of a transmitted signal that includes a pilot tone.

The inphase-data-plus-pilot-tone signal 8 and quadrature data signal 4 are passed through pulse shaping filters 102, 104, respectively. The resulting filter outputs 112, 114 are modulated onto inphase and quadrature carriers 116, 118, respectively, of frequency $f_c$ generated by a transmitter local oscillator 106. The pulse shaping filters have a delay of $\tau_p$ seconds to make the pulse casual. The modulated carriers 122, 124 are added together to produce a transmit signal 130, and the spectrum of the transmit signal 130 is shown in FIG. 3. The transmit signal 130 passes through a channel 300 having a frequency response modeled by an impulse response filter (h(t)) 310 and wherein it is corrupted by additive channel noise, v(t).

With reference again to FIG. 1, the receiver 200 initially demodulates, or down-converts, the received signal 230 by multiplying it against inphase and quadrature carrier reference signals 216, 218 generated by a receiver local oscillator 206. As noted above, movement of the receiver relative to the transmitter produces a Doppler shift in the received signal and this shift contributes to the time varying phase error, $\phi_e(t)$. The other contributor to the phase error is the difference in the frequencies of the transmitter local oscillator 106 and the receiver local oscillator 206. As will be described below, the receiver 200 extracts the pilot tone from the received signal to produce a phase error estimate that is then used in a final adjustment to eliminate any residual carrier frequency error. This use of a pilot tone is possible because of the linear relationship that exists between the phase error detected in the pilot tone and the phase error present in the carrier.

The inphase and quadrature downconverted signals 222, 224 are passed through a pair of low-pass filters 212, 214, respectively, each having a bandwidth approximately equal to 1/2T Hz. The filter outputs are sampled at a rate that is greater than the two-sided bandwidth of the data signal, e.g. at a rate of 2/T samples/second, to produce a set of inphase data samples, $X(^I)_n$, and a set of quadrature data samples, $X(^Q)_n$. This conversion of the downconverted signals into data samples facilitates the use of a software implementation of the pilot tone recovery 220.

Figure 4:
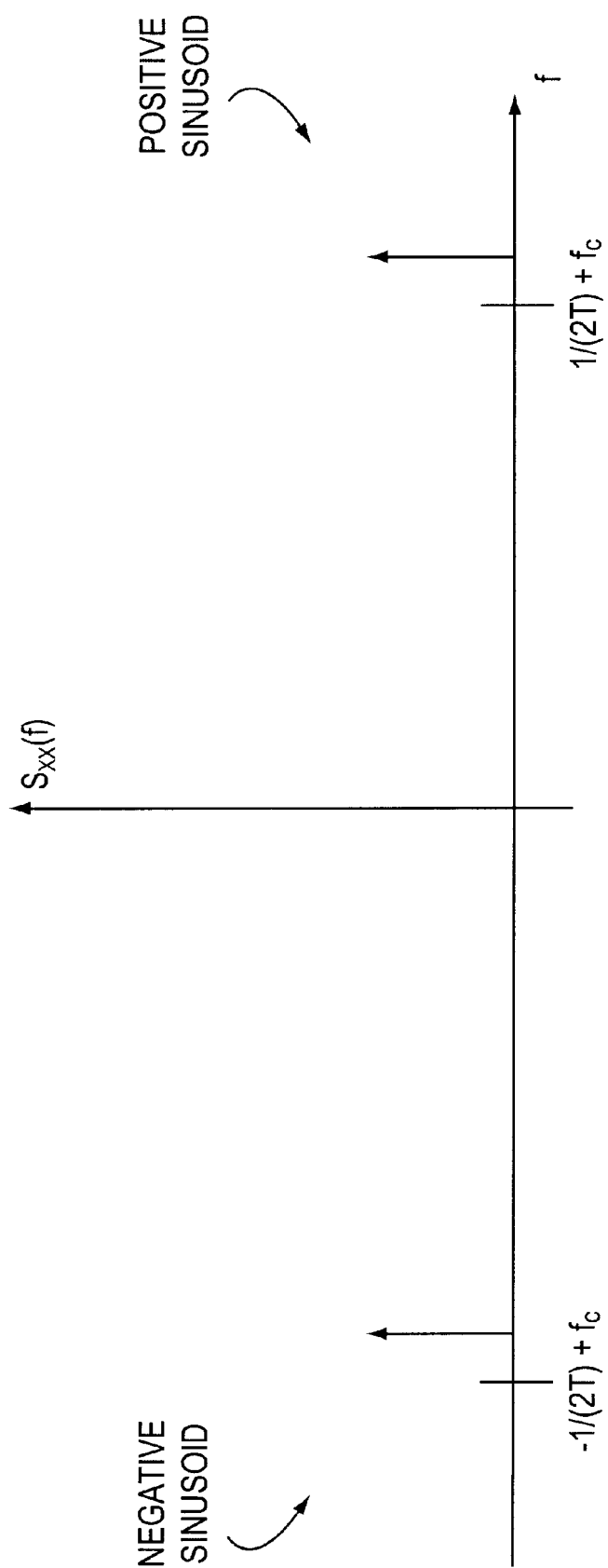
FIG. 4 is the frequency domain representation of a received pilot tone.

Although at the transmitter the pilot tone is a single real sinusoid of frequency 1/2T, due to the frequency shifts it must be considered as two complex sinusoids at the receiver. The frequency domain representation of the received complex pilot tone is illustrated in FIG. 4. The original pilot tone at the transmitter is:

$$u(t) = U_0 \sin\left(2\pi\left(\frac{1}{2T}\right)t\right)$$
$$= U_0 \frac{e^{j2\pi(\frac{1}{2T})t} - e^{-j2\pi(\frac{1}{2T})t}}{2j},$$

where $U_0$ is the pilot tone's amplitude. Thus, the "real" pilot tone may actually be considered as two complex tones, corresponding to the two terms in the equation above. The phase shift in the complex tone caused by the channel are:

$$\phi_c^+ \equiv \angle H\left(\frac{1}{2T}\right), \text{ and} \quad (A)$$

$$\phi_c^- \equiv \angle H\left(-\frac{1}{2T}\right).$$

The received pilot tone (assuming the use of linear phase pulse shaping filters 102 and 104) is $$w(t) = [u(t) * p(t - \tau_p) * h(t)] \cdot A e^{j\phi_e(t)}$$
$$= \left[U_0 \sin\left(2\pi\left(\frac{1}{2T}\right)t\right) * p(t - \tau_p) * h(t)\right] \cdot A e^{j\phi_e(t)}$$
$$= \left[U_0 \left(\frac{e^{j2\pi\frac{1}{2T}t} - e^{-j2\pi\frac{1}{2T}t}}{2j}\right) * p(t - \tau_p) * h(t)\right] \cdot A e^{j\phi_e(t)}$$
$$= U_0 \left|P\left(\frac{1}{2T}\right)\right| \left(\frac{\left|H\left(\frac{1}{2T}\right)\right| e^{j(2\pi\frac{1}{2T}(t-\tau_p)+\phi_c^+)}}{2j} - \frac{\left|H\left(-\frac{1}{2T}\right)\right| e^{-j(2\pi\frac{1}{2T}(t-\tau_p)-\phi_c^-)}}{2j}\right) A e^{j\phi_c(t)}$$

The functions p(t) and P(f) are the pulse shaping filter's impulse response and frequency response, respectively; the functions h(t) and H(f) are the channel's impulse response and frequency response, respectively; and the function $\phi_e(t)$ is the phase error caused by Doppler shift and/or local oscillator inaccuracy. The phases of the two complex sinusoids are $$\theta^+(t) = 2\pi\left(\frac{1}{2T}\right)(t - \tau_p) - \frac{\pi}{2} + \phi_c^+ + \phi_e(t) \text{ and} \quad (B)$$

-continued $$\theta^-(t) = -2\pi\left(\frac{1}{2T}\right)(t-\tau_p) + \frac{\pi}{2} + \phi_c^- + \phi_e(t).$$

The two phases are added and the result divided to produce a phase error estimate $$\hat{\theta}(t) = \frac{\theta^+(t) + \theta^-(t)}{2} = \phi_e(t) + \frac{\phi_c^+ + \phi_c^-}{2} = \phi_e(t) + \phi_c.$$

Therefore, the phase error estimate is equal to the phase error to be tracked, $\phi_e(t)$, plus a constant phase error, $\phi_c$, caused by the phase shift of the channel. In the case of an ideal channel, the constant phase error forms a part of the phase which is to be tracked. In the case of a non-ideal channel, the constant phase error will be an average of two components, $\phi_c^+$ and $\phi_c^-$. The use of an equalizer for the non-ideal case is common practice in the art, and the constant phase error is corrected by such a device.

Figure 5:
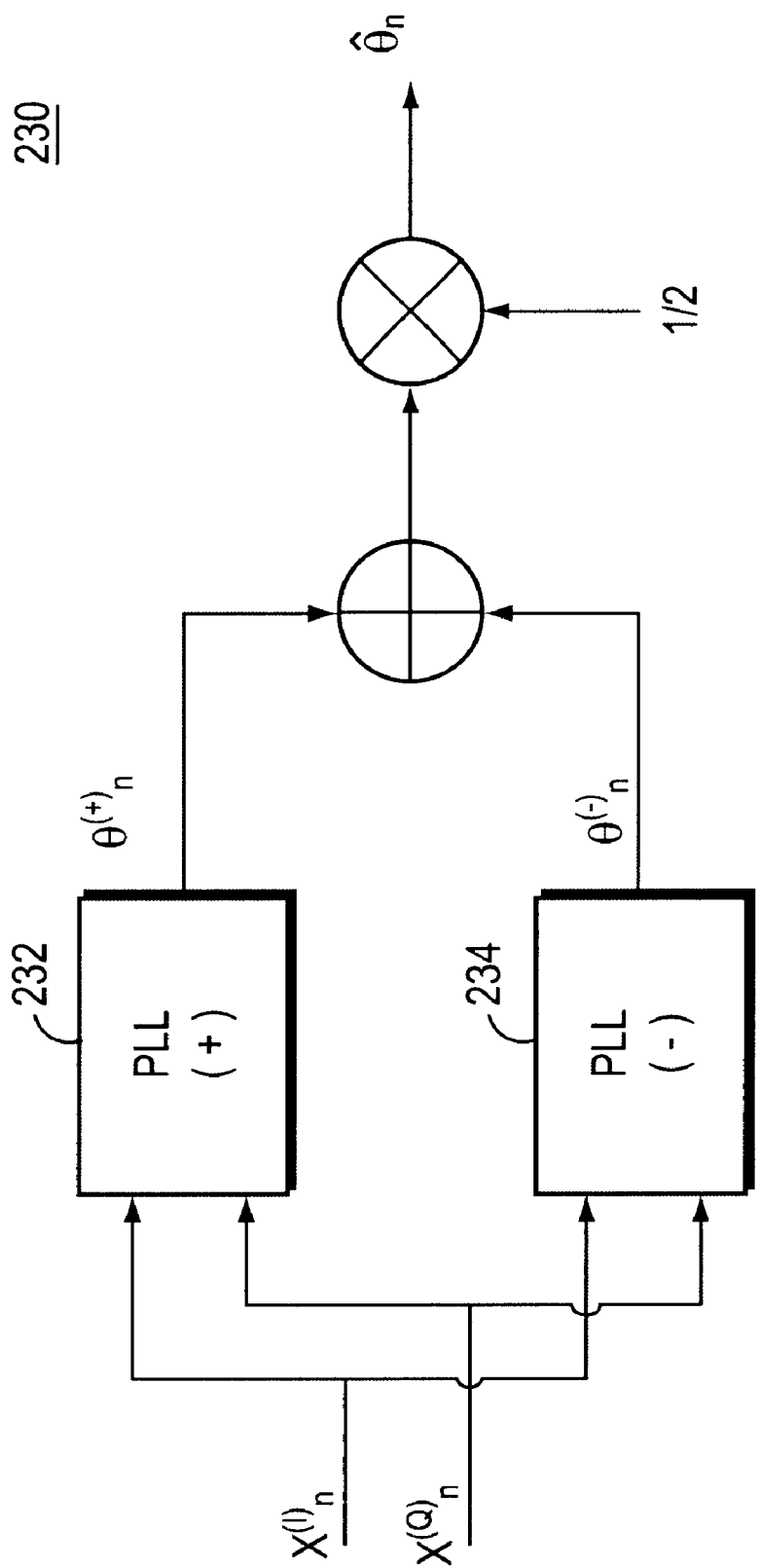
FIG. 5 is a diagram of a circuit for estimating the phase error in the received signal.

The frequency domain representation of the received complex pilot tone is illustrated in FIG. 4. The phase estimation circuit 230 of FIG. 5 is comprised of a pair of phase-locked loops (PLLs) 232, 234. The first PLL, PLL (+) 232, is configured to lock on to the complex tone centered near 1/2T Hz, and the second PLL, PLL (−) 234, is configured to lock on to the complex tone centered near −1/2T Hz. The output of PLL (+) 232 is the sum of the pilot tone's phase and the phase error introduced by the channel and/or the inaccurate reference, and the output of PLL (−) 234 is the sum of the negative of the pilot tone's phase and the same phase error. These two outputs, $\theta^{(+)}_n$ and $\theta^{(-)}_n$, are added, and the resulting sum is divided by two in half to produce an estimate of the phase êrror, $\theta_n$, which is caused by Doppler shift and by the phase difference between the transmitter and receiver local references.

Figure 6:
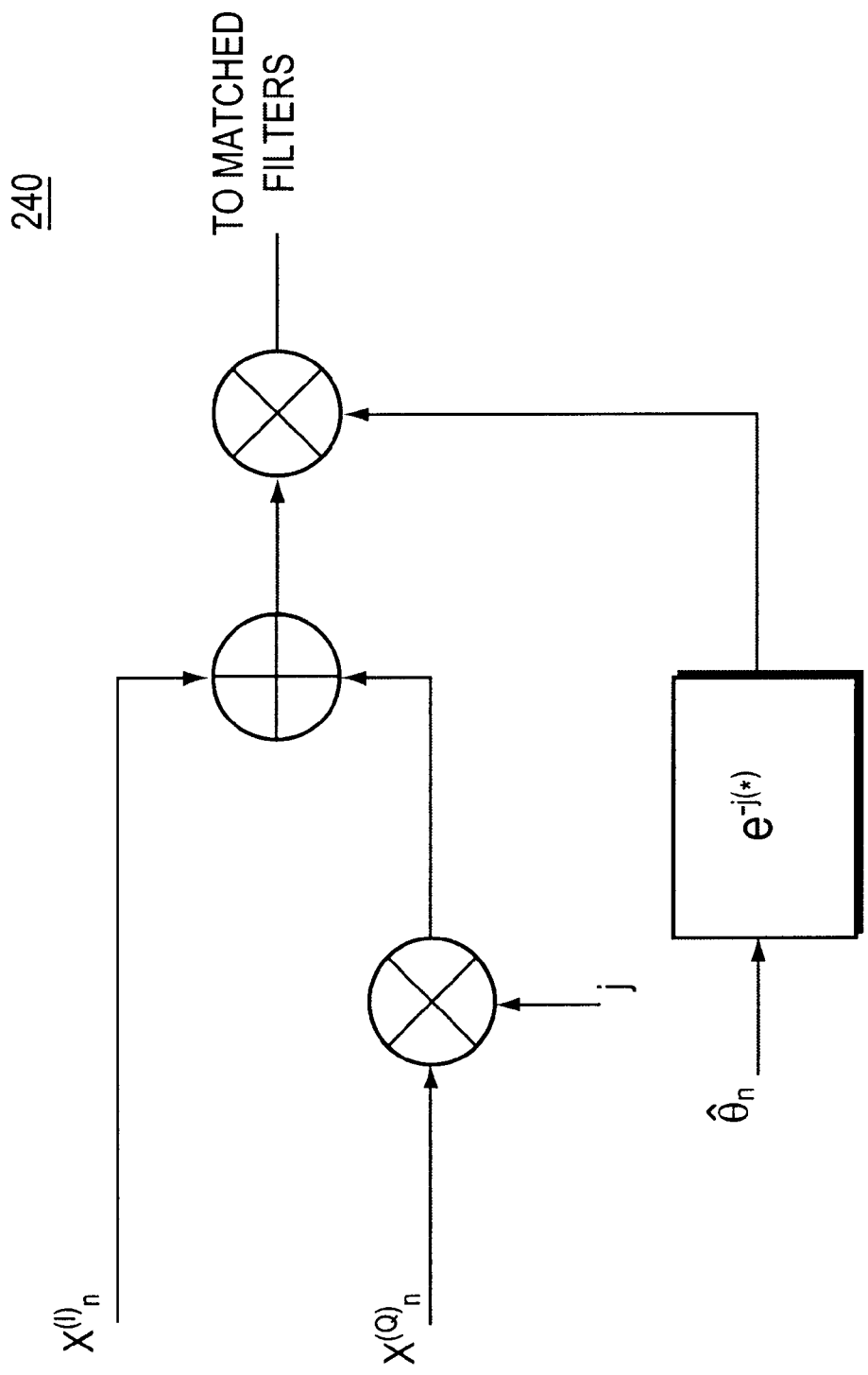
FIG. 6 is a diagram of a circuit for elimination of the estimated phase error from the baseband signal.

The elimination of the phase error in the demodulated data is accomplished by the phase error correction circuit 240 of FIG. 6. A phase error phasor of unit magnitude and phase equal and opposite to the estimated phase error, $\theta_n$, is initially generated. The phasor may be represented mathematically as $e^{j\theta n}$. The phase error present in the demodulated data is removed by multiplying the phasor against the complex data signal, i.e., $X^{(I)}_n + jX^{(Q)}_n$. The result is then passed to the remainder of the receiver, which is usually comprised of the matched filter pair 202, 204 (matched to the pulse shaping filters 102, 104 of the transmitter 100) and the conventional equalization and error-correcting circuitry 250 (FIG. 1), to produce an estimate of the inphase part, $a_i$, of the $i^{th}$ data symbol, and an estimate of the quadrature part, $b_i$, of the $i^{th}$ data symbol.

Figure 7:
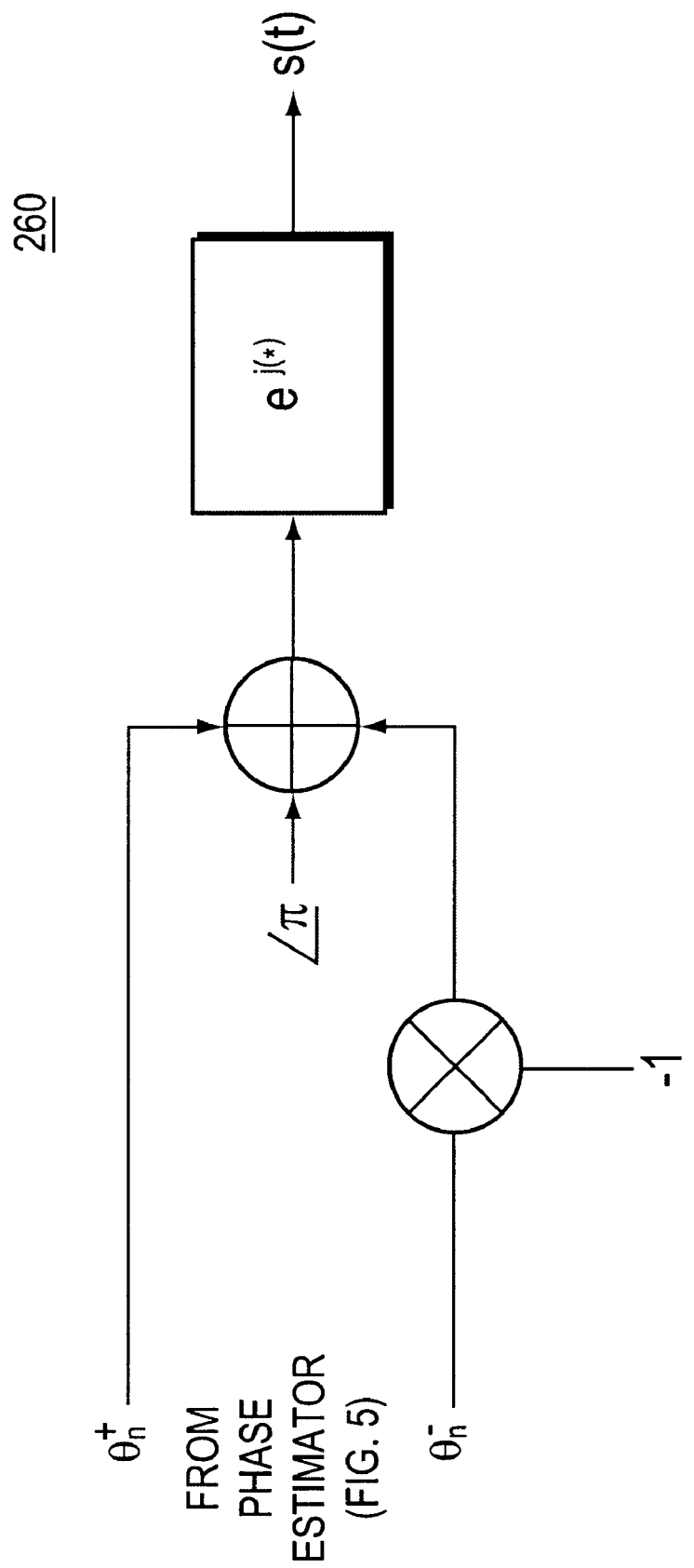
FIG. 7 is a diagram of a circuit for producing a sample timing estimate from the pilot tone.

The pilot tone may also be used to produce a sample timing estimate. The sample timing estimate is extracted from the phases, $\theta^{(+)}_n$ and $\theta^{(-)}_n$, produced by PLL (+) 232 and PLL (−) 234, respectively, by the sample timing estimator of FIG. 7 in a manner similar to that by which the phase estimate is produced by the phase estimator. For the purposes of timing recovery, it will be assumed that the frequency response of the channel is flat, i.e., $$h(t) = H_0 \delta(t - \tau_c).$$

Then, from equation (A), $$\phi_c^+ = -2\pi\left(\frac{1}{2T}\right)\tau_c, \qquad (C)$$

$$\phi_c^- = -2\pi\left(-\frac{1}{2T}\right)\tau_c. \qquad (D)$$

The signal s(t), which will be used for the timing estimation, is constructed from the phases of the two tones as $$s(t) = e^{j(\theta^+(t) - \theta^-(t) + \pi)} \qquad (E)$$

Substituting equations (C) and (D) into equation (B) and the result into equation (E) produces $$s(t) = e^{j2\pi(\frac{1}{T})(t - \tau_p - \tau_c)}. \qquad (F)$$

The phase of the signal is zero at the points $t_i = \tau_p + \tau_c + iT$ for $i \in -\infty$ to $+\infty$.

In order to obtain maximum eye openings, the received signal should be sampled when the phase of the signal of equation (E) is equal to zero. Accordingly, the sample timing estimator 260 of FIG. 7 produces a phasor estimate of unit magnitude and a phase equal to the phase, $\theta^{(+)}_n$, produced by PLL (+) 232, minus the phase, $\theta^{(-)}_n$, produced by PLL (−) 234, and further advanced by 180 degrees. The estimate is then passed to a sample clock circuit 270 which uses the estimate to adjust the phase of the sampling clock.

The foregoing description has been limited to a specific embodiment of this invention. It will be apparent, however, that variations and modifications may be made to the invention, with the attainment of some or all of its advantages. For example, it will be recognized by those skilled in the art that alternative methods of pilot tone recovery and sample timing estimation may exist. Therefore, it is the object of the appended claims to cover all such variations and modifications as come within the true spirit and scope of the invention.

What is claimed is:

1. A telecommunications system comprising:
   (A) a transmitter for transmitting a modulated carrier into a channel, including:
      (i) an adder for adding a pilot signal to the inphase component of a data signal, said data signal comprised of data symbols having a symbol interval with a midpoint, said pilot signal having a frequency equal to the inverse of two times the symbol interval, a first zero crossing point located at a first symbol interval midpoint, and a second zero crossing located at a next symbol interval midpoint, and
      (ii) a modulator for modulating the data signal and pilot signal on to a carrier sinusoid to produce the modulated carrier; and
   (B) a receiver for receiving from the channel the modulated carrier transmitted by the transmitter, said receiver including:
      (i) a demodulator for demodulating the received modulated carrier to produce a demodulated signal, having an inphase component and a quadrature component;
      (ii) a phase estimator for recovering the pilot tone from the demodulated signal produced by the demodulator to produce a phase error estimate, of the pilot tone, calculated using the outputs of a pair of phase locked-loops, which when combined, said outputs produce a phase error estimate; and (iii) a phase adjuster for adjusting the phase of the demodulated signal based on the phase error estimate which is applied to a complex data signal to produce an inphase component estimate and a quadrature component estimate, adjusted for phase error.

2. The telecommunications system of claim 1 wherein the receiver further comprises:

a sample timing estimator, receiving the output from the phase estimator, for generating a sample timing estimate having periodic points of zero phase relative to the pilot tone contained in the received signal, said demodulator including means in synchronism with said points of zero phase to produce the demodulated signal.

3. The telecommunications system of claim 1 wherein the phase estimator is comprised of a pair of filters for tracking the inphase and the quadrature components of the pilot tone to produce the phase error estimate.

4. The telecommunications system of claim 1 wherein the modulation is quadrature modulation.

5. The telecommunications system of claim 1 wherein the modulation is trellis-coded modulation.

6. The telecommunications system as defined in claim 1, wherein said phase estimator includes at least a pair of phase-locked loops, a first phase-locked loop having an output which is the sum of said pilot tone's phase and a phase error introduced by said channel or other reference, and the second phase-locked loop being the sum of the negative of the pilot tone's phase and said phase error introduced by said channel or other reference; and an adder circuit, which combines the two, outputs of the phase-locked loops and uses the resulting sum to produce an estimate of the phase error.

7. The telecommunications system as defined in claim 6 further comprising:

a phase error correction circuit which has as an input the phase error estimate produced by said phase estimator and which removes phase error present in demodulated data in a received signal by multiplying a representation of the phase error computed against the complex data signal to produce an estimate of the in-phase portion and an estimate of the quadrature portion of the received signal.

8. A method for carrier phase tracking in a telecommunications system comprised of a transmitter and a receiver, said transmitter performing the steps of:

adding a pilot signal to a data signal, said data signal comprised of data symbols having a symbol interval with a midpoint, said pilot signal having a frequency equal to the inverse of two times the symbol interval, a first zero crossing point located at a first symbol interval midpoint, and a second zero crossing located at a next symbol interval midpoint, modulating the data signal and pilot signal on to a carrier sinusoid, and transmitting the modulated carrier into a channel; and said receiver performing the steps of receiving from the channel the modulated carrier transmitted by the transmitter;

demodulating the received modulated carrier to produce a demodulated signal, having an inphase component and a quadrature component;

recovering the pilot signal from the demodulated signal produced by the demodulator to produce a phase error estimate, of the pilot tone, calculated using the outputs of a pair of phase locked-loops, which when combined, said outputs produce a phase error estimate;

sampling the inphase component and the quadrature component of the recovered pilot signal to calculate a phase-error estimate from said samples; and adjusting the phase of the demodulated signal based on the phase error estimate which is applied to a complex data signal to produce an inphase component estimate and a quadrature component estimate, adjusted for phase error.

9. The method of claim 8 wherein the receiver performs the additional steps of:

generating a sample timing estimate having periodic points of zero phase, and aligning sampling points of a sampling clock with the zero phase points of the estimate, said sampling clock being used in the demodulating step for sampling the received modulated carrier to produce the demodulated signal.

10. The method of claim 8 wherein the modulation is quadrature modulation.

11. The method of claim 8 wherein the modulation is trellis coded modulation.

12. A receiver for receiving from a channel a signal comprising a carrier modulated with periodic data symbols and with a pilot signal having a frequency equal to the symbol the inverse of two times the symbol interval, said pilot signal having zero crossings coinciding with the midpoints of the symbol intervals, said receiver comprising:

(i) a demodulator for demodulating the received modulated carrier to produce a demodulated signal, having an inphase component and a quadrature component;

(ii) a phase estimator for recovering the pilot tone from the demodulated signal produced by the demodulator to produce a phase error estimate, of the pilot tone, calculated using the outputs of a pair of phase locked-loops, which when combined, said outputs produce a phase error estimate; and (iii) a phase adjuster for adjusting the phase of the demodulated signal based on the phase error estimate which is applied to a complex data signal to produce an inphase component estimate and a quadrature component estimate, adjusted for phase error.

13. The receiver of claim 12 said receiver further comprising:

a sample timing estimator, receiving the output from the phase estimator, for generating a sample timing estimate having periodic points of zero phase, said sample timing estimate for aligning sampling points of a sampling clock with the zero phase points of the sample timing estimate; said demodulator sampling the received signal with the sampling clock to produce the demodulated signal.

14. The receiver of claim 12 wherein the phase estimator is comprised of a pair of filters for tracking separate components of the pilot tone to produce the phase error estimate.

15. The receiver of claim 12 wherein the modulation of the data symbols is quadrature modulation.

16. The receiver of claim 12 wherein the modulation of the data symbols is trellis coded modulation.

* * * * *